US005424111A

United States Patent [19]

Farbstein

[11] Patent Number: 5,424,111
[45] Date of Patent: Jun. 13, 1995

[54] THERMALLY BROKEN INSULATING GLASS SPACER WITH DESICCANT

[76] Inventor: Malcolm N. Farbstein, 9818 Bridle Rd., Philadelphia, Pa. 19115

[21] Appl. No.: 11,207

[22] Filed: Jan. 29, 1993

[51] Int. Cl.[6] ............ E06B 3/24; B32B 3/10

[52] U.S. Cl. ............ 428/137; 428/34; 428/138; 428/160; 428/192; 428/209; 156/109; 52/172; 52/790

[58] Field of Search ............ 428/34, 137, 33, 83, 428/122, 134, 138, 155, 159, 160, 192, 209, 425.9; 52/171.3, 172, 788-790, 399, 204.71, 813, 579, 717.02, 717.04; 156/107, 109

[56] References Cited

U.S. PATENT DOCUMENTS

| | | | |
|---|---|---|---|
| H975 | 11/1991 | Selkowitz et al. | 52/172 |
| 2,193,393 | 3/1940 | Danner | 20/56.5 |
| 2,618,819 | 11/1952 | Goodwillie | 428/34 |
| 2,915,793 | 12/1959 | Berg | 20/56.5 |
| 2,996,419 | 8/1961 | Schmick | 154/128 |
| 3,758,996 | 9/1973 | Bowser | 52/171 |
| 3,903,665 | 9/1975 | Harrison | 52/171 |
| 4,074,480 | 2/1978 | Burton | 52/127 |
| 4,222,213 | 9/1980 | Fessler | 52/790 |
| 4,431,691 | 2/1984 | Greenlee | 428/34 |
| 4,446,850 | 5/1984 | Zilisch | 126/431 |
| 4,476,169 | 10/1984 | Nishino et al. | 428/34 |
| 4,479,988 | 10/1984 | Dawson | 428/34 |
| 4,520,602 | 1/1985 | Miller | 52/173 R |
| 4,525,406 | 6/1985 | Pollock | 428/137 |
| 4,658,553 | 4/1987 | Shinagawa | 428/34 |
| 4,835,130 | 5/1989 | Box | 502/62 |
| 4,994,309 | 2/1991 | Reichert et al. | 428/34 |
| 5,007,217 | 4/1991 | Glover et al. | 52/172 |
| 5,087,489 | 2/1992 | Lingemann | 428/34 |
| 5,087,498 | 2/1992 | Lingemann | 428/34 |
| 5,088,258 | 2/1992 | Schield et al. | 52/398 |

OTHER PUBLICATIONS

Swanson, Improving Product Performance Using Warm-Edge Technology, Fenestration, Jul./Aug. 1991, pp. 22-28.

Wilson, Closing The Gaps In Window Efficiency, Popular Science, Aug. 1992, p. 46.

*Primary Examiner*—Donald J. Loney
*Attorney, Agent, or Firm*—Robert M. Skolnik

[57] ABSTRACT

In thermally insulating glass, an improved spacer is made with material and designed to be less thermally conductive then conventional metal spacers by providing a complete thermal brake between metallic side support members so that no metallic path is provided across the insulating material. The insulating material contains a moisture absorbent.

13 Claims, 2 Drawing Sheets

THERMALLY BROKEN INSULATING GLASS SPACER WITH DESICCANT

CROSS-REFERENCE TO RELATED APPLICATIONS

This application includes the subject matter of Disclosure Document No. 308832, dated Jun. 15, 1992 in the name of Malcolm N. Farbstein.

1. Field of the Invention

This invention thermally insulating glass and to improved spacers made with material and designed to be less thermally conductive then conventional metal spacers. The invention also relates to the composition of the thermally broken spacer material containing a moisture absorbent and to the method and apparatus for forming the spacer.

2. Description of the Prior Art

Danner, U.S. Pat. No. 2,193,393 discloses two sheets of glass spaced with a wire reinforce glass bead fused between the two sheets.

Schmick, U.S. Pat. No. 2,996,419 teaches a special mixture of heated metal and silicone to adhere to glass to join glass sheets together.

Berg, U.S. Pat. No. 2,915,793 covers the mounting of a shade screen between two panels of glass and teaches the use of a moisture absorbent 17 in the spacer between the panels.

Bowser, U.S. Pat. No. 3,758,996 discloses a hermetically sealed multiple glazed window unit containing an air space dehydrator element comprising a desiccant material dispersed in a matrix of moisture vapor transmittable material.

Harrison U.S. Pat. No. 3,903,665, shows an active structure which moves air between two glass panels circulating insulating material in the space between the panels.

Burton, U.S. Pat. No. 4,074,480 makes a double panel window by attaching a spacing frame containing a desiccant around the existing windows.

Greenlee, U.S. Pat. No. 4,431,691 discloses a dimensionally stable sealant and spacer strip comprising an elongated ribbon of deformable sealant enveloping and having embedded therein spacer means extending longitudinally of the ribbon of sealant. The thickness of the enveloping sealant extends beyond the spacer means in an amount sufficient to maintain a continuous sealing interface under applied compressive forces but insufficient to permit substantial distortion of the strip under applied compressive forces.

Zilisch, U.S. Pat. No. 4,446,850, is another active system similar to Harrison though functioning as a solar energy panel.

Nishino, et al, U.S. Pat. No. 4,476,169 relates to specific desiccant compositions for a multilayer glass spacer. Opening 7 is designed for vapor adsorption by communication with space 4.

Dawson, U.S. Pat. No. 4,479,988 shows a spacer bar for glass panels employing a hollow extrusion of polycarbonate filled with a glass fiber as reinforcement.

Box, U.S. Pat. No. 4,835,130 relates to a sealant composition for insulating glazed windows having a sealed air pocket. The composition comprises outgassed zeolite having pores with apertures large enough to permit entry of gases into the pore spaces and having on the surface, covering the pore apertures a fluid which is essentially impermeable to nitrogen and oxygen molecules and is permeable to water.

Miller, U.S. Pat. No. 4,520,602 is another on site kit for converting an existing single pane window to double panels.

Reichert, et al., U.S. Pat. No. 4,994,309 discloses a multiple layer sealed glazing unit with an insulating spacer made of oriented thermoplastic polymer material interposed between the separate glazing layers and adjacent to the periphery thereof.

Selkowitz et al., SIR H975 is a complex structure of multiple layered glazings with insulating gaps therebetween.

Glover, U.S. Pat. No. 5,007,217 discloses a resilient spacer assembly including an inner spacer sandwiched between the sheets and located inwardly of the glazing edges creating an outwardly facing perimeter channel. The inner spacer is comprised of a moisture permeable foam material which may be flexible or semi-rigid. The spacer contains desiccant material and has a pressure sensitive adhesive pre-applied on two opposite sides adjacent the sheets. The inwardly directed fact of the spacer is resistant to ultra-violet radiation and the spacer can be coiled for storage. The assembly also has an outer sealing filling in the channel.

Schield, et al. U.S. Pat. No. 5,088,258 provides a thermal break 14 at the sides of the spacer.

As discussed in the article IMPROVING PRODUCT PERFORMANCE USING WARM-EDGE TECHNOLOGY in the July/August 1991 edition of *FENESTRATION*, pages 22–28, and in the article CLOSING THE GAPS IN WINDOW EFFICIENCY in the August, 1992 edition of *POPULAR SCIENCE*, page 46, the designs of the edge structures is of significance in improving the thermal efficiency of multi-panel windows. As these articles suggest, the solutions of the prior art have not met the needs of the industry as each of the prior art designs are characterized by various problems, limitations and the attendant trade-offs.

SUMMARY OF THE INVENTION

The present invention is a spacer having a complete thermal break for use at the edges of multi-pane windows. The spacer consists of two aluminum side portions connected to either edge of a thermal break material impregnated with desiccant. The device may be formed by filling existing aluminum spacers of shapes disclosed in the prior art and debridging the aluminum spacer to expose the thermal break material. The invention dramatically reduces heat conduction by eliminating the metal path from one edge of the spacer to the other while retaining the structural advantages of the metal edges.

The thermal break material of my invention is an elastomeric thermoplastic or thermosetting material containing a desiccant such as zeolite, silica gel or calcium oxide. The thermal break material has the required strength to serve as the structural support between the panes of glass.

Spacers formed of the above material is characterized by being dimensionally stable over the range of temperatures in to which the window is exposed. The material does not exude volatile materials which could cloud or fog the interior glass surface.

The spacer of my invention is made on a roll-forming line where the thermally broken material with desiccant is proportioned in mixing equipment and injected into the open side of a roll-formed spacer. The material is allowed to cure on the line and is then debridged. The debridged spacer is then cut to size and is ready for use.

A principal object of my invention is the provision of a spacer for multi-panel window glass which has a complete thermal break. A further object and advantage of my invention is the provision of such a spacer which has no metal path from one edge to the other. A still further object and advantage of my invention is the use of thermally broken spacer material blended with a desiccant such as zeolite, silica gel or calcium oxide. Another object and advantage of my invention is the provision of a spacer which can be manufactured using conventional roll-forming equipment.

BRIEF DESCRIPTION OF THE DRAWINGS

These as well as further objects and advantages of the invention will become apparent to those skilled in the art from a review of the following detailed specification reference being made to the accompanying drawings in which.

DETAILED DESCRIPTION OF THE INVENTION

Figure 1:
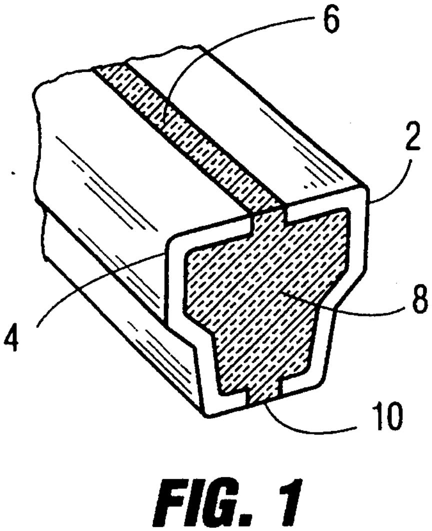
FIG. 1 is a perspective view of the spacer of my invention.

FIG. 1 is a perspective view of the spacer of my invention. As shown therein, metallic edges 2 and 4 are adhered to a central core of the thermal break material with desiccant. Metallic edges 2 and 4 are of irregular shape. Because of the composition of the thermal break material, a compete thermal break 6 and 10 is provided. The thermal break material of my invention has the required strength to serve as the spacer element between glass panels.

Figure 2:
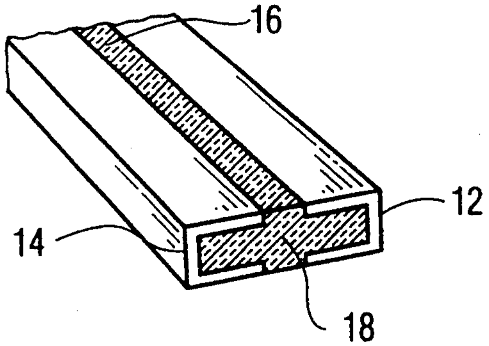
FIG. 2 is a perspective view of another configuration of a spacer of my invention.
Figure 3:
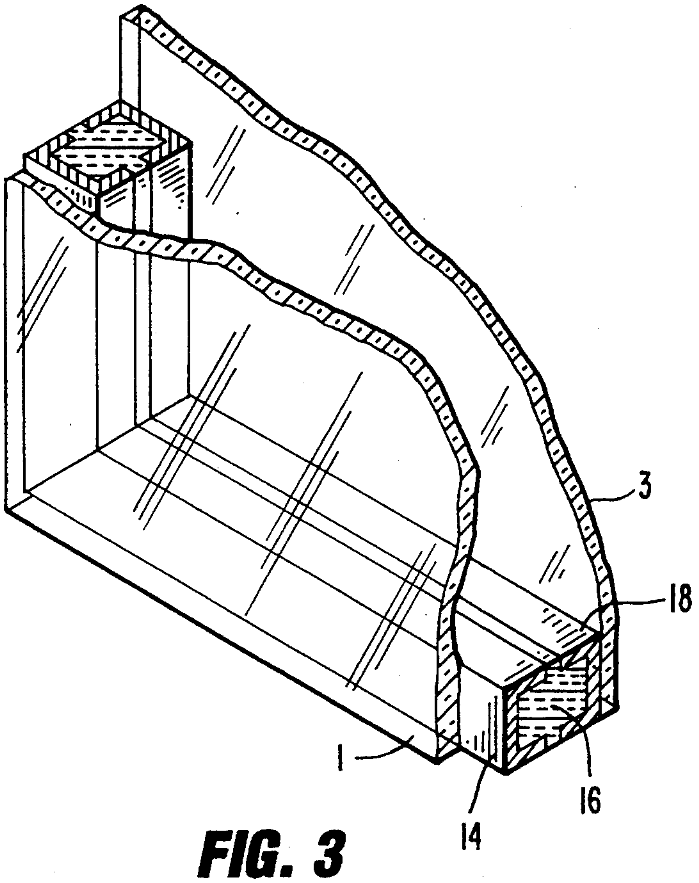
FIG. 3 is a perspective view of a spacer in use between two glass panels.

FIG. 2 is another configuration of spacer. The spacer of FIG. 2 is a simple rectangle having metallic edges 12 and 14 with a complete thermal break at 16 and 18. As shown in FIG. 3, the spacer of FIG. 2 is adhesively connected between two glass panels 1 and 3 in the manner set forth in the prior art such as U.S. Pat. No. 5,088,258.

The spacers of FIGS. 1 and 2 have been tested for thermal insulating performance. These tests and their results are as follows. Two identical insulated glass units 24″×48″ incorporating ½″ air spacer and ¼″ glass were assembled. One of the units (the "Prototype Unit"), had a spacer formed in the configuration shown in FIG. 1 of this application. The other unit (the "Control Unit") had a spacer comprised of the conventional spacer, the first item described at the aforementioned page 46 of the August, 1992 POPULAR SCIENCE article, namely an aluminum spacer filled with desiccant. Side 1 of both units were exposed to 0° F. (outdoor temperature) and side 2 of both units were exposed to 70° F. (indoor temperature). Temperatures were taken at the unit's edge using a surface thermometer. U-values (the coefficient of thermal transmittance) is determined in accordance with the following equation:

$$U=q/A(t_1-t_2)\,(L)$$

where q=time rate of heat flow through area A, Btu/hr.

A=area normal to heat flow, $ft^2$;

$t_1$=temperature of warm surface, oF $t_2$=temperature of cold surface, oF

L=length of path of heat flow, in.

The following results were obtained:

| | Glass Edge Temperature | Edge U-Value |
|---|---|---|
| Control Unit | 28° F. | .57 |
| Prototype Unit | 41° F. | .48 |
| or a 16% improvement in Edge U-Value. | | |

These spacers have high thermal insulating performance because they are characterized by large thermal breaks (6, 10 in FIG. 1 and 16, 18 in FIG. 2).

Figure 4:
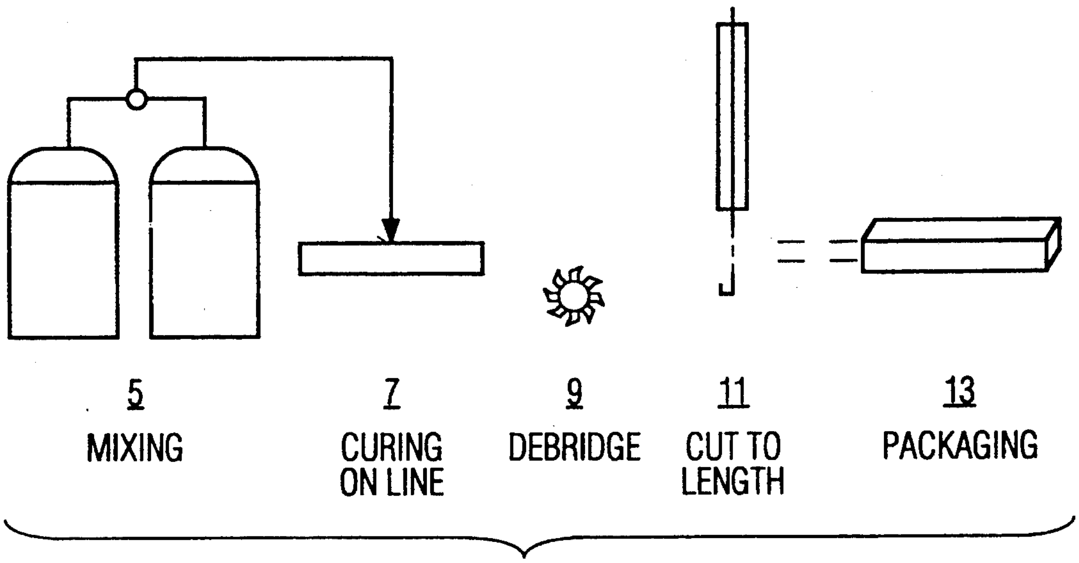
FIG. 4 is a block diagram of the equipment used to manufacture the spacer of FIGS. 1 or 2.

FIG. 4 is a block diagram of the process for assembly line manufacturing of the thermally broken spacers of FIGS. 1 and 2. As will be described in the examples below, the thermally broken material is proportioned in the mixing and/or extruder equipment shown generally at 5. The material is then injected into the opened side of the roll-formed spacer 7. The material cures or cools on line until the spacer is debridged at 9. The debridged spacer is cut to size at 11 and packaged at 13. The following table sets forth the assembly line equipment used in each of the steps of FIG. 4:

5 mixing and dispensing onto open top of spacer;

7 curing on line;

9 saw to cut open back end (debridge);

11 cut to length on line with saw;

13 packed in moisture proof cartons;

The following are examples of the preparation of thermosetting and thermoplastic compositions of the thermally broken material of my invention.

EXAMPLE 1

Two pounds of a thermosetting thermally broken insulating glass spacer material (an elastomeric polyurethane filled with a desiccant) were prepared by mixing the materials of Part A and Part B below in the ratio 2.86 to 1 at a temperature of 70° F., for 15 seconds. The material can then be continuously reaction extruded or cast into the desired spacer shape.

PART A: Part A is a polyol mixture having a molecular weight of 200–2800 blended with a desiccant at ambient temperature under vacuum of 25″ Hg. The following ingredients were blended: Polyol 1.06 parts, catalyst (Organobismuth) 0.005 parts, Zeolite 3A 0.4 parts. PART B: Part B is a mixture of diphenylmethane diisocyanate (MDI), pigments and phthalate (alternatively, or parafinic plasticizer may be used) blended in an inert atmosphere at ambient temperature under a vacuum of 25″ Hg. The following ingredients were blended: MDI 1.00 parts, carbon black 0.025 parts, phthalate plasticizer 1.00 parts.

EXAMPLE 2

Two pounds of a thermoplastic thermally broken insulating glass spacer material (an elastomeric thermoplastic filled with a desiccant) were prepared by blending the following materials a temperature of 350° F., pressure of 25" Hg. for 30 minutes. The material can then be extruded into the desired spacer shape.

1.8 pounds ethylene vinyl acetate copolymer;

0.5 pounds desiccant (zeolite).

Figure 5A:
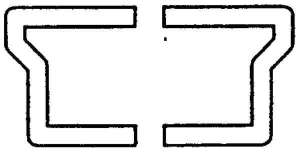
FIG. 5A–5C are end views of alternative spacer configurations for my invention.
Figure 5B:
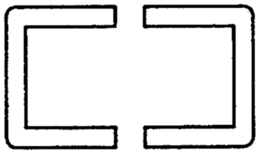
Figure 5C:
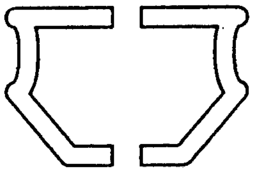

FIGS. 5A–5C are end views of alternative existing spacer shapes which can be modified in accordance with my invention. These alternative shapes are used as a function of the way sealant is applied between the spacer and the glass. FIG. 5A is used for sealants applied by gunning or troweling. FIG. 5B is used with hot melt extruder sealants. FIG. 5C is used with dual sealants, one in the curved indentations and the other in the spaces adjacent the straight angular portions of the spacer.

It will be understood that as modifications to the invention may be made without departing from the spirit and scope of the invention, what is sought to be protected is set forth in the appended claims.

I claim:

1. A thermally broken insulating spacer for a pair of glass panels comprising: a central core of thermally insulating material; first and second substantially U shaped metallic side portions each of said U shaped portions being formed by a side wall and two substantially parallel end walls connected to said side wall, said side walls and said substantially parallel end walls being attached to and substantially surrounding said central core, said first and second metallic side portions having no connection with each other except as provided by said central core, said first metallic side portion being formed for contacting one of a pair of glass panels, and said second metallic side portion being formed for contacting the other of said pair of glass panels.

2. The spacer of claim 1 wherein said insulating material includes an elastomeric thermoplastic filled with a desiccant.

3. A single thermally broken insulating spacer for glass panels comprising: a central core of thermally insulating material; first and second separate substantially U shaped metallic support portions attached to and substantially surrounding said central core, said first and second metallic support portions having no connection with each other except as provided by said central core.

4. The spacer of claim 3 wherein said insulating material includes an elastomeric polyurethane filled with a desiccant.

5. An insulating spacer for separating a pair of glass panels comprising: a generally rectangular central core of thermally insulating material said central core having two sides, a top surface and a bottom surface; a first U shaped metallic support portion attached to and substantially surrounding said central core at one side of said central core; a second U shaped metallic support side portion attached to and substantially surrounding said central core at the other side of said central core, opposite said first side; said top and said bottom surfaces being exposed to provide a substantially complete thermal break between said metallic side portions each of said U shaped metallic support side portions having a first surface for contacting and supporting a glass panel and second and third surfaces extending substantially perpendicular from said first surface for defining a channel which substantially surrounds said central core.

6. The spacer of claim 5 wherein said insulating material contains an elastomeric thermoplastic filled with a desiccant.

7. A thermally broken insulating spacer for glass panels comprising: a central core of thermally insulating material; first and second debridged substantially U shaped metallic side portions attached to said central core, said first and second debridged substantially U shaped metallic side portions having substantially no metallic connection with each other.

8. The spacer of claim 7 wherein said insulating material includes an elastomeric polyurethane filled with a desiccant.

9. A substantially thermally broken insulating spacer for glass panels comprising: a central core of thermally insulating material; first and second separate debridged substantially U shaped metallic support portions attached to said central core, said first and second separate debridged substantially U shaped metallic support portions having substantially no thermal connection to each other.

10. The spacer of claim 9 wherein said insulating material includes an elastomeric rubber urethane having a desiccant therein.

11. In an insulating spacer having a core of insulating material and two substantially U shaped metallic side portions attached to the core for supporting and connecting at least two glass panels with each panel being attached to respective substantially U shaped metallic side portions, the substantially U shaped metallic side portions having substantially no metallic connection to each other produced by the process including the steps of forming said substantially U shaped metallic side portions by surrounding said core of insulating material in metal and debridging a portion of the metal to substantially eliminate metallic connection between said substantially U shaped metallic side portions.

12. A thermally broken insulating spacer for glass panels comprising: a central core of thermally insulating material; first and second debridged substantially U shaped metallic side portions attached to and substantially surrounding said central core, said first and second debridged substantially U shaped metallic side portions having substantially no metallic connection with each other.

13. A substantially thermally broken insulating spacer for glass panels comprising: a central core of thermally insulating material; first and second separate substantially U shaped metallic support portions said U shape being formed by a side wall and two substantially parallel end walls connected to said side wall, said side walls and said substantially parallel end walls being attached to and surrounding said central core, said first and second substantially U shaped separate metallic support portions having substantially no thermal connection to each other.

* * * * *